UNITED STATES PATENT OFFICE.

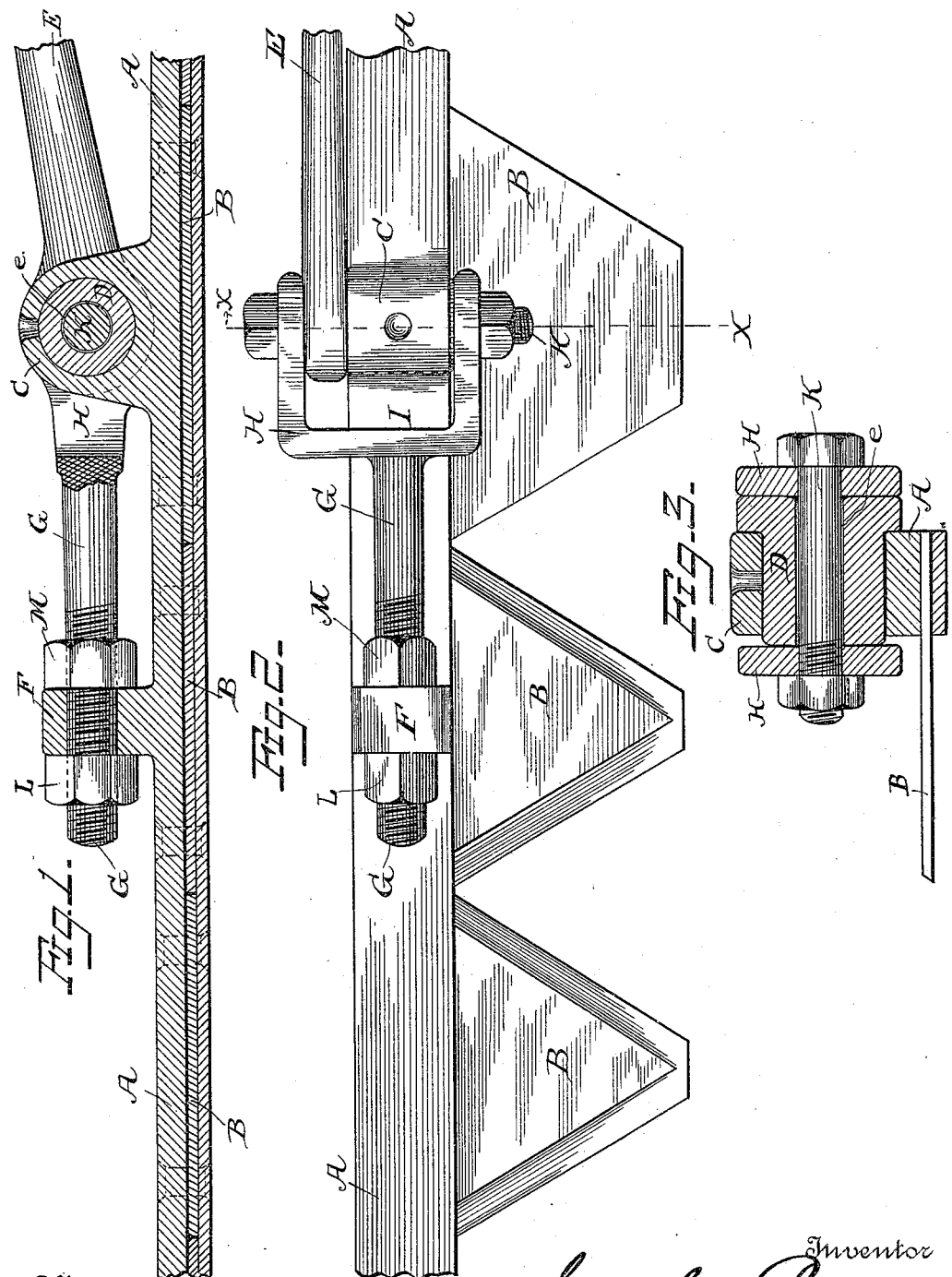

JOSEPHUS BAUM, OF RIDGE FARM, ILLINOIS.

PITMAN CONNECTION FOR HARVESTERS.

SPECIFICATION forming part of Letters Patent No. 447,930, dated March 10, 1891.

Application filed November 24, 1890. Serial No. 372,464. (No model.)

*To all whom it may concern:*

Be it known that I, JOSEPHUS BAUM, a citizen of the United States, residing at Ridge Farm, in the county of Vermilion and State of Illinois, have invented a new and useful Improvement in Pitman Connections for Harvesters, of which the following is a specification.

This invention relates to certain improvements in harvesters; and it has for its objects to adjust the pitman which drives the cutter-bar so as to provide for moving the said bar accurately at all times by preventing slack or lost motion, and to so construct the pitman that it can be connected to the right or left of the cutter-bar, as may be desired.

The above-mentioned objects I attain by the means illustrated in the accompanying drawings, in which—

Figure 1 represents a longitudinal vertical sectional view of the cutter-bar of a harvester, the pitman, and my improved connecting devices. Fig. 2 represents a plan view thereof, and Fig. 3 a transverse vertical section taken on the line $x\ x$ of Fig. 2.

Referring to the drawings, the letter A indicates the reciprocating cutter-bar of a harvester having the usual angular cutting-knives B projecting from its forward edge. The said bar near one end is provided with a vertical lug C, which is bored transversely for the reception of the boss D on the connecting end of the driving-pitman E, the exterior of said boss being turned or finished so as to fit the bore accurately. The boss has a bore $e$ extending longitudinally through it for the passage of the bolt K, hereinafter mentioned. The cutter-bar is also provided with a vertical lug F at a proper distance from the lug C, before mentioned, and this lug is provided with an opening having its axis in a longitudinal line with the cutter-bar for the reception of the screw-threaded end of shank G of a link H, which connects the two lugs and the pitman to the cutter-bar. The said link is bifurcated at one end, as indicated by the letter I, and the bifurcated portion is located so as to embrace the lug C at one side and the outside connecting end of the pitman E and connect the same. The members of the bifurcated portion of the link are provided with apertures which are of the same diameter as the aperture through the boss of the pitman and which are coincident with the said aperture through the boss when the parts are in position for the reception of a bolt K, which is headed at one end and screw-threaded at the other for the reception of a nut, so as to securely bind the connecting parts to the lug C. The threaded portion of the shank G is provided with nuts L M at each side of the lug F, by means of which the bifurcated link H may be adjusted so as to compensate for wear in the connecting parts of the pitman and cutter-bar and prevent any lost or slack motion of the latter.

It will be observed that by the construction of the link and the bossed pitman the boss may be inserted at either side of the lug C and the link secured to the connecting parts, thus adapting the connection to a cutter-bar operated from either the right or left hand side of a cutter-bar.

Having thus described my invention, what I claim, and desire to secure by Letters Patent, is—

1. The combination, with the cutter-bar of a harvester having two vertical lugs, of the pitman provided with a boss at its outer end, having an opening extending through it and adapted to work in the outer lug of the cutter-bar, a link having a shank threaded at one end and bifurcated at the other to embrace the outer lug and bossed pitman, the bolt K, and the nuts located on the threaded shank of said link, whereby compensation for the wear of the parts may be made and lost or slack motion of the cutter-bar prevented, substantially as specified.

2. The combination, with the reciprocating cutter-bar of a harvester having two vertical lugs, of the pitman having a boss at its connecting end provided with an opening extending through it and adapted to be fitted at either side of the outer lug, the reversible bifurcated link, the threaded bolt, and nuts, whereby the pitman may be connected at the right or left hand end of the cutter-bar, substantially as specified.

JOSEPHUS BAUM.

Witnesses:
A. P. SAUNDERS,
J. A. KENDALL,